United States Patent [19]
Middleton

[11] 3,902,607
[45] Sept. 2, 1975

[54] TOBACCO HARVESTER PLANT HANDLING SYSTEM

[75] Inventor: Carlisle A. Middleton, Baltimore, Md.

[73] Assignee: Liggett & Myers Incorporated, Durham, N.C.

[22] Filed: Oct. 29, 1974

[21] Appl. No.: 518,614

Related U.S. Application Data

[63] Continuation-in-part of Ser. No. 445,156, Feb. 25, 1974, Pat. No. 3,855,762, which is a continuation-in-part of Ser. No. 365,564, May 31, 1973, Pat. No. 3,798,884.

[52] U.S. Cl. .................................. 214/5.5; 56/27.5
[51] Int. Cl.² ........................................ A01D 45/16
[58] Field of Search .............. 214/5.5, 152; 294/5.5; 56/27.5

[56] References Cited
UNITED STATES PATENTS

| | | | |
|---|---|---|---|
| 945,717 | 1/1910 | Gullickson | 214/5.5 |
| 2,477,068 | 7/1949 | La Motte | 214/5.5 X |
| 2,954,132 | 9/1960 | Davis | 214/5.5 |
| 3,079,744 | 3/1963 | Newswanger | 214/5.5 X |

*Primary Examiner*—Frank E. Werner
*Attorney, Agent, or Firm*—John F. McClellan, Sr.

[57] ABSTRACT

An improved plant handling system in a tobacco harvester of the type having means for cutting stalks of tobacco, successively impaling them on a spear, and passing them along the spear onto a tobacco stick, including: a novel "disappearing" type spear gripping system with jaw-sets which alternately reciprocate from shielded retracted position to spear gripping position and back, novel alternating-grip spacing and plant urging structure spacing, a special yielding stalk-centering system for improving gripping co-action and a novel "Y" throat plant intake system which prevents clogging of the spear gripping system caused by plant doubling, and which enhances operation of the plant centering and spear gripping systems.

26 Claims, 10 Drawing Figures

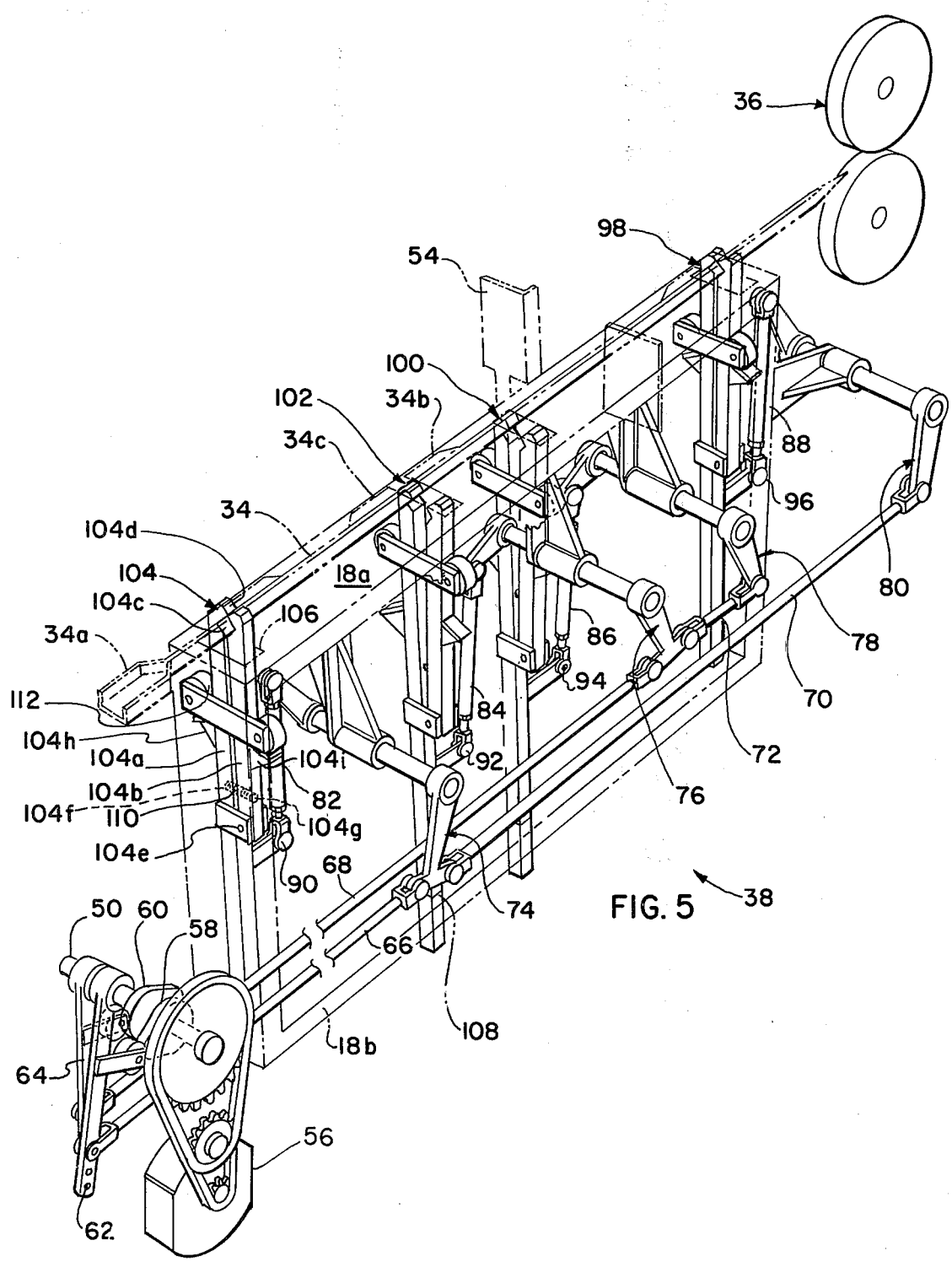

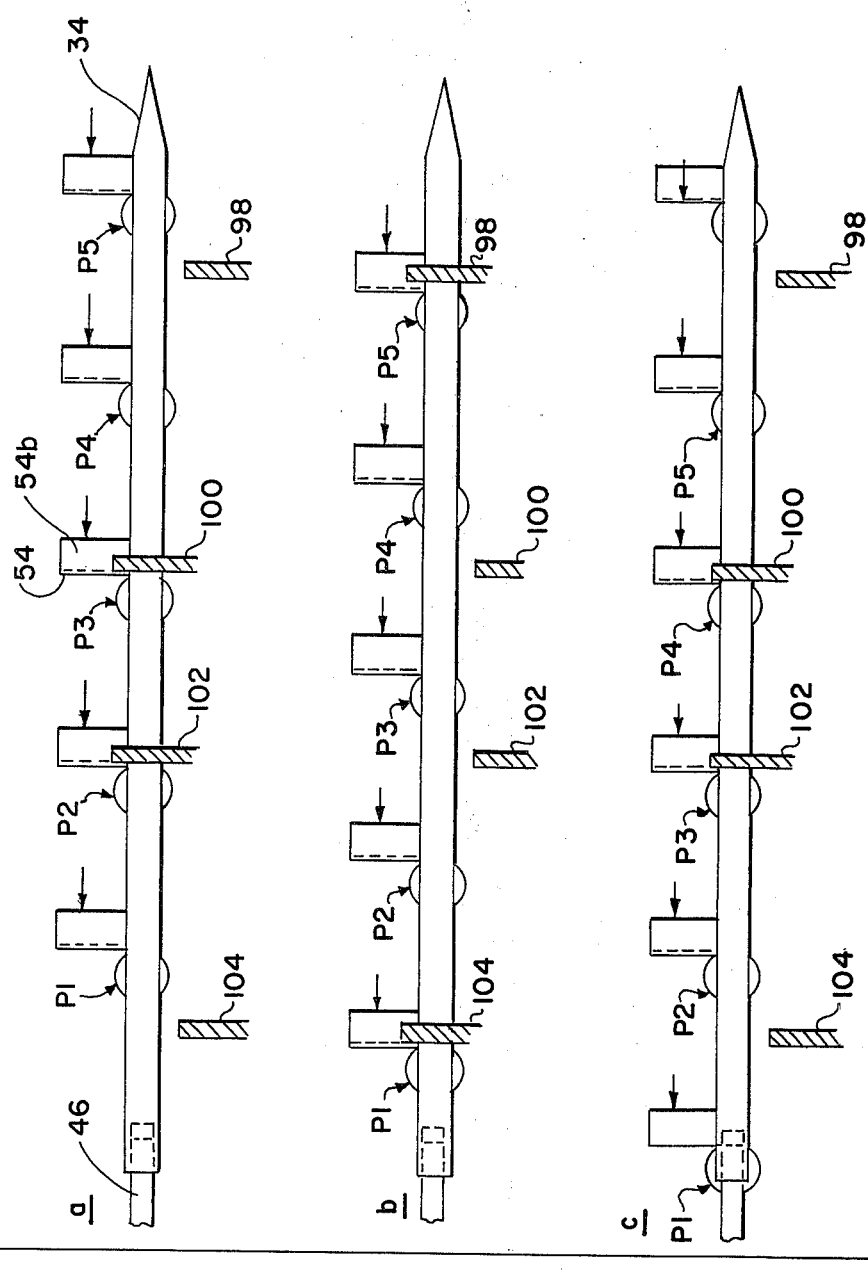
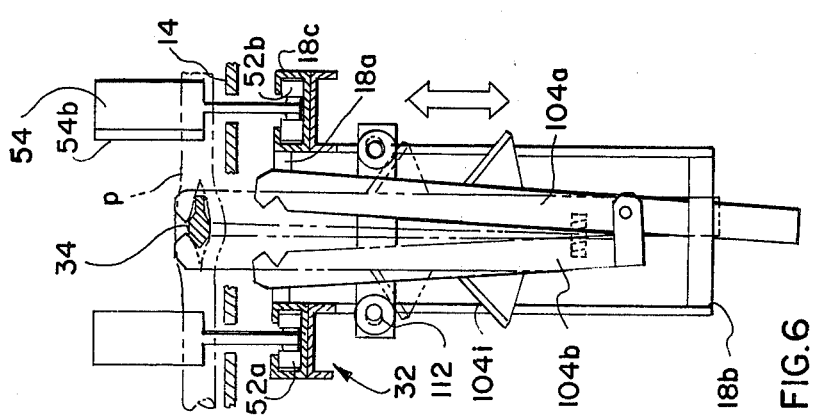
FIG.7, ONE INCREMENT OF CONVEYOR MOTION

TOBACCO HARVESTER PLANT HANDLING SYSTEM

This application is a continuation in part of my copending application Ser. No. 445,156, filed Feb. 25, 1974, for TOBACCO HARVESTER WITH IMPROVED SPEARING SYSTEM now U.S. Pat. No. 3,855,762, and which was in turn copending as a continuation-in-part of a prior application of mine Ser. No. 365,564, May 31, 1973, now U.S. Pat. No. 3,798,884, issued Mar. 26, 1974, for TOBACCO HARVESTER.

This invention relates generally to tabacco harvesting and particularly to a system for improved handling of tobacco plants in air-cure type tobacco harvesting.

My above-referenced disclosed matter describes harvesting apparatus field-proven to excel at harvesting air-cure type tobacco; the present invention concerns further refinement of the plant handling system of that harvester making the apparatus even more accommodative of odd sizes, shapes and spacings of plants, more reliable, easier to adjust and to operate, and above all, even more protective of plants handled by it.

In brief cursive summary, given for purposes of description only and not as limitation, the improved plant handling system comprehends detail improvements including a "Y"-shaped plant intake conveyor shape to prevent doubling, a sprung-roller system for more accommodatively receiving of plants forwarded from the intake conveyor system, a spear gripping system having jaw-sets which reciprocatively retract to respective shielding recesses when not gripping, and plant urging structure proportioned to shield the respective jaw-sets while closing.

The above objects and advantages of this invention will become more readily apparent on examination of the following description, including the drawings in which:

FIG. 5 is a right rear quarter fragmentary isometric view of a harvester system adapted from 5—5, FIG. 1;

FIG. 6 is a front elevation diagrammatic detail adapted from 6—6, FIG. 1;

FIG. 7 is a diagrammatic flow chart repeating, three times, side-elevation details adapteed from 7—7, FIG. 1;

GENERAL DESCRIPTION OF THE HARVESTER, FIGS. 1-3

Figure 1:
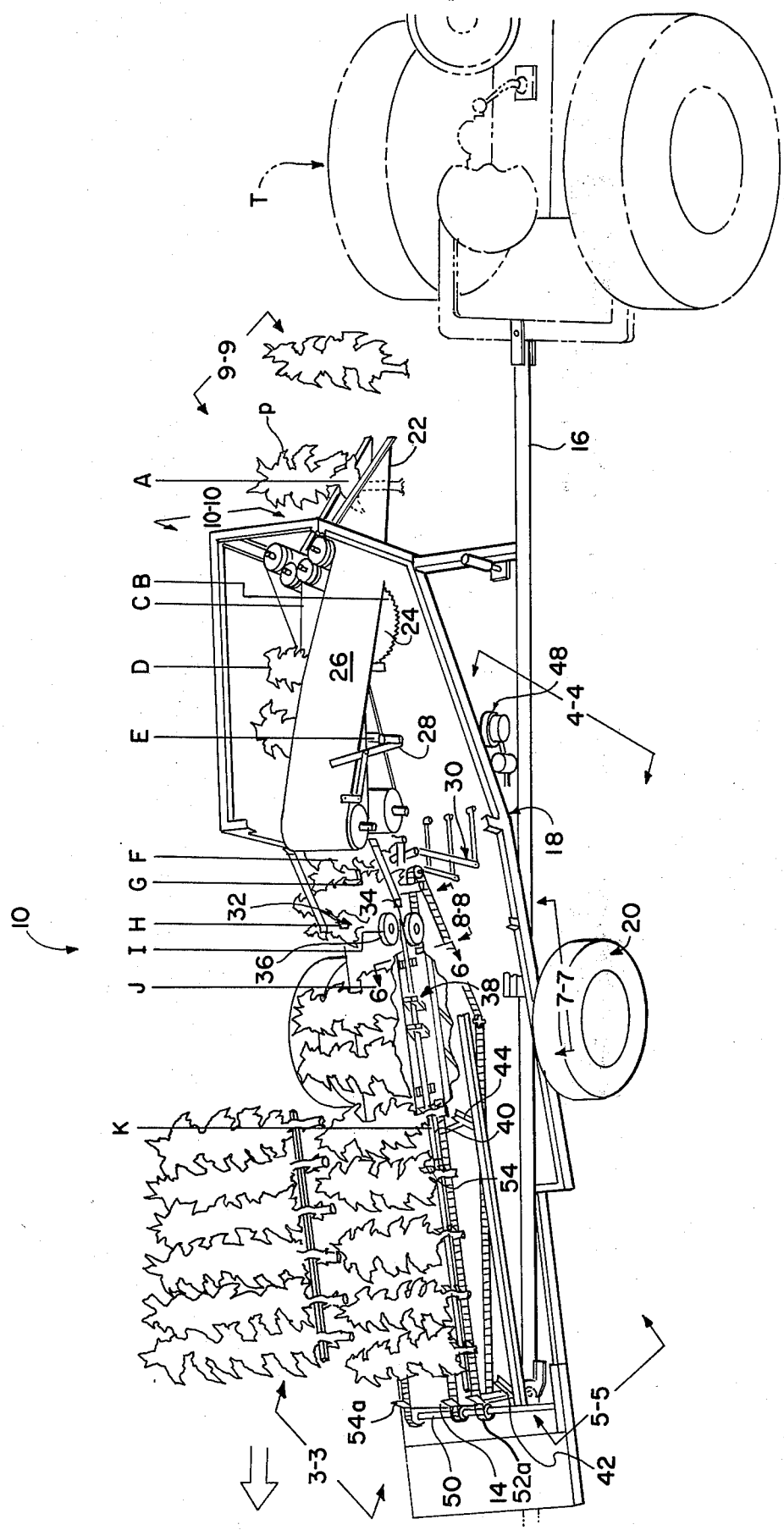
FIG. 1 is a right side isometric diagrammatical view of portions of harvester systems.
Figure 2:
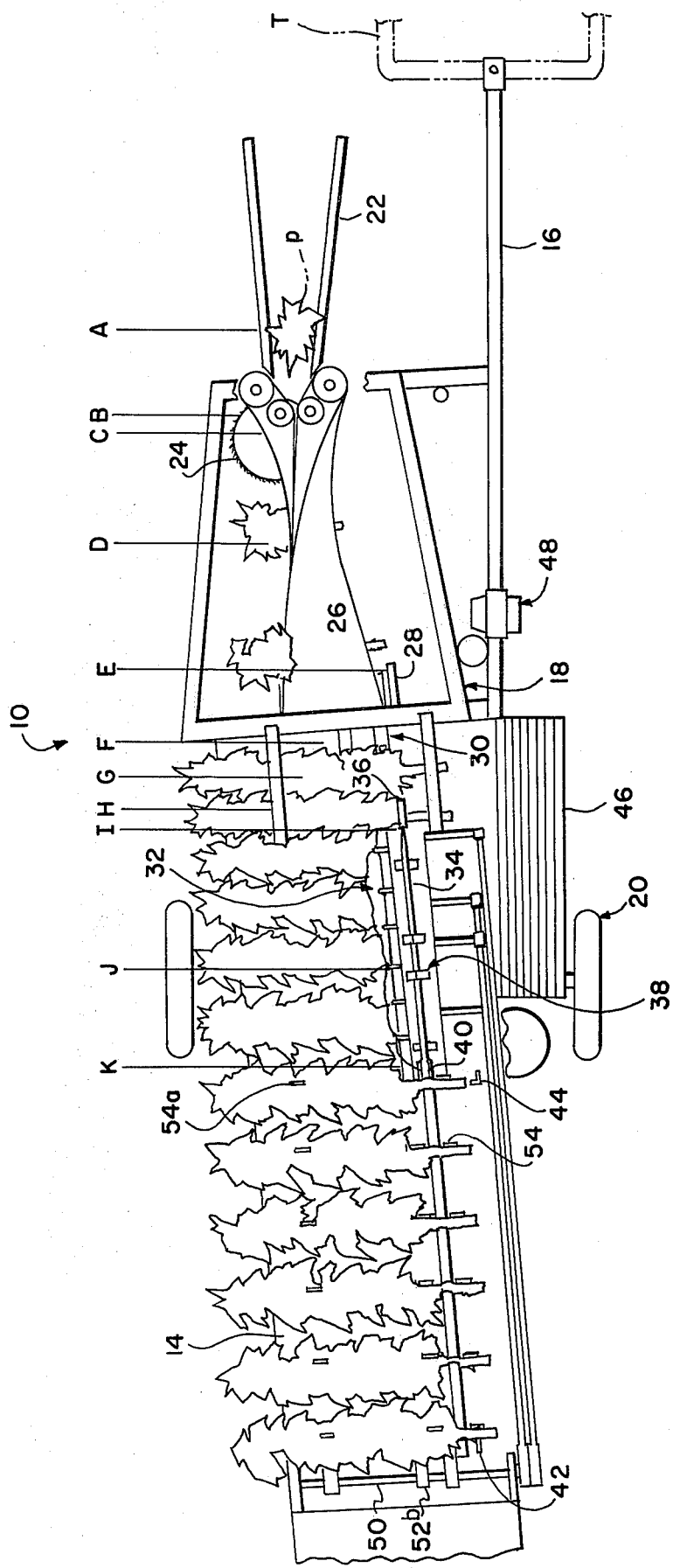
FIG. 2 is a plan view of portions of harvester systems.
Figure 3:
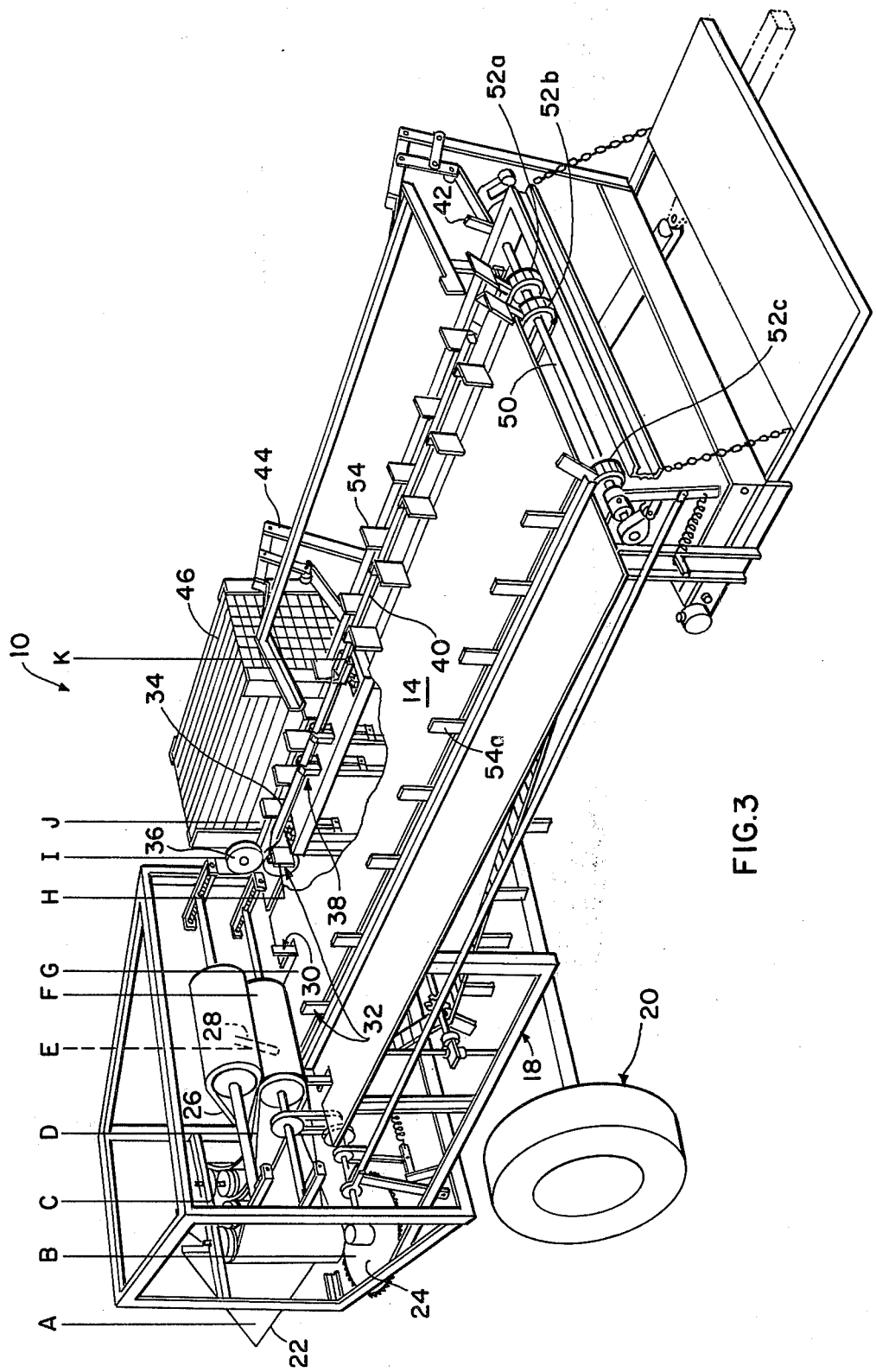
FIG. 3 is a left rear quarter isometric view of portions of harvester systems adapted from 3—3, FIG. 1.

FIGS. 1–3 show the general relations of the systems of the tobacco harvester 10 of this invention, generally centered around a table or platform 14 with appurtenant accessories, the vehicle being preferably drawn by a tractor T by means of a tongue 16 attached to frame 18 on which the platform is supported and which is mounted on a wheel and axle assembly 20.

At Station A guides 22 funnel stalks of standing plants p into a circular saw 24 at Station B which severs the stalks near the ground. At Station C paired belts 26 grasp and convey the severed plants upwardly and rearwardly, Station D, the plants being laid over generally as they rise, as the belts twist between vertical lower rollers and horizontal upper rollers mounting and driving them, each plant in turn triggering a synchronizing system 28 at Station E before discharge by dropping downward free of the belts at Station F. Triggering the synchronizing system produces one increment of rearward motion of the horizontal conveyor system, to be described next.

At Station G, where the plants drop downward free of the belts, a shuttle system 30 pushes the plants rearwardly into the grasp of a horizontal conveyor system 32, Station H, having three chains equipped with parallel sets of pushers which intermittently move the plants rearwardly, in equal increments under direction of the synchronizing system, impaling the butts in sequence on the point of a spear 34 fixed in horizontal position pointing forward between vertically related plant-centering rollers 36 at Station I.

At Station J the impaled plants are forced by the horizontal conveyor system rearwardly along the spear between two double sets of semi-caliper type laterally operating jaws of a spear gripping system 38 which maintains the spear in the horizontal fore-and-aft position at all times, while dodging the passing plants by alternately opening and disappearing downward, then rising and closing, so that at least one double set of jaws grasps the spear at any moment. The synchronizing system co-ordinates the action.

As Station K the impaled plants pass onto a tobacco stick 40, rearwardly aligned with the spear, and when the stick is filled, trigger a sensor 42, ejecting the stick upwardly for manual removal and replacing the filling tobacco stick with an empty stick manually fed into the feeder system 44 from a supply of sticks 46 (FIGS. 2 and 3) in co-alignment with the spear, ready for another sequence of plants.

A gasoline engine and hydraulic pump drive system 48 (FIGS. 1 and 2, and fragmentarily indicated in the other Figures) operate the systems preferably. A power output shaft 50 at the rear drives the horizontal conveyor system 32 of endless belt assemblies 52a, 52b, 52c (best shown in FIG. 3) having parallel thrust arms 54 on belts closely paralleling the spear and smaller arms 54a on a third belt.

Shaft 50 also drives the spear gripper system 38. Details of structure and operation not set out here are like those given in my above mentioned U.S. Pat. No. 3,798,884.

THE SPEAR AND SPEAR GRIPPER SYSTEM

Figure 4:
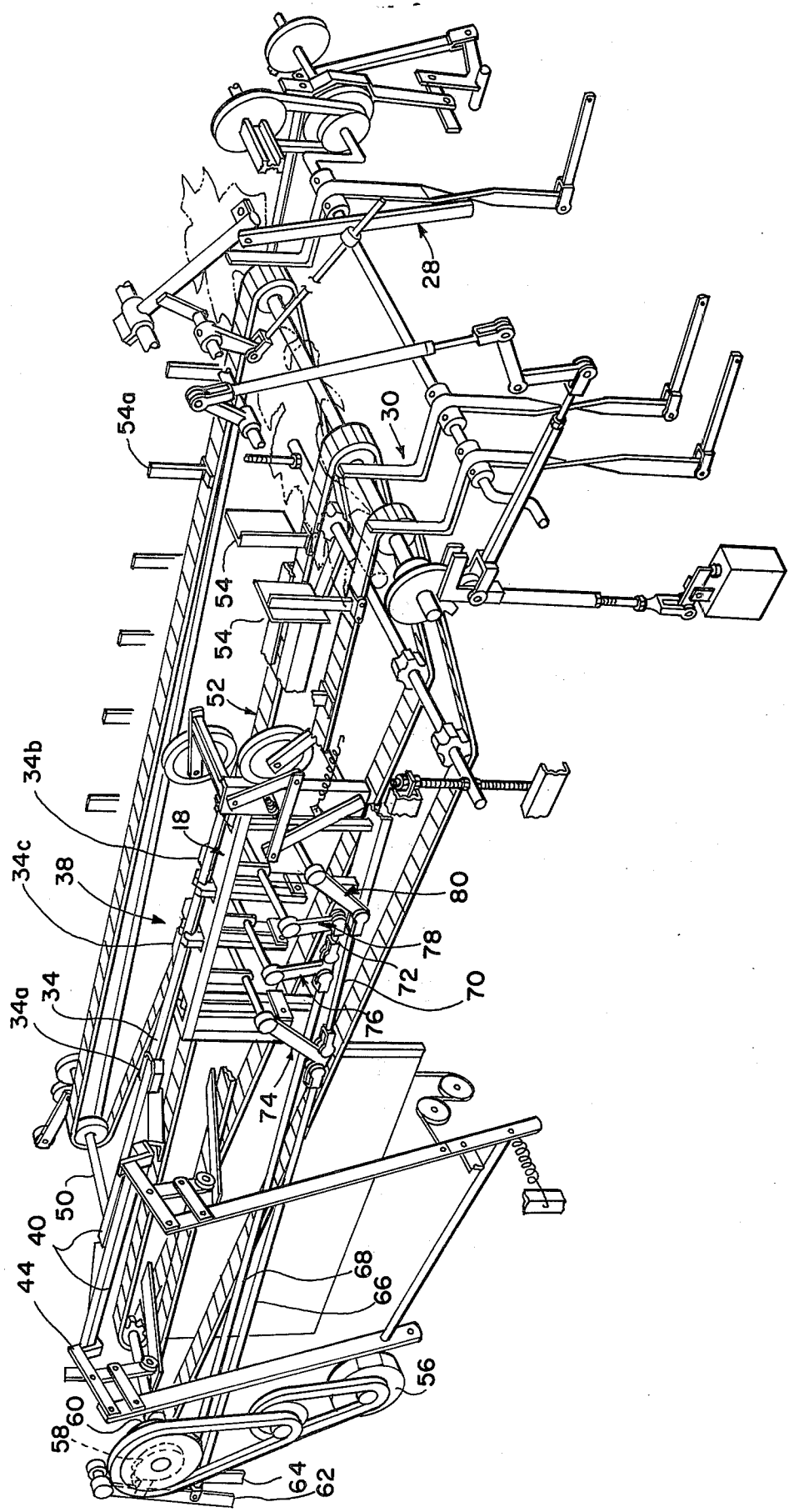
FIG. 4 is right front quarter isometric detail adapted from 4—4, FIG. 1.

FIGS. 4 and 5 illustrate the general arrangement of the spear and spear gripper system 38. The spear 34 preferably comprises a laterally broadened modified-hex-section steel bar oriented with edge faces preferably right angled and at 45° to the vertical. The front has a point and the rear has a shovel-like socket 34a for receiving a tobacco stick end in alignment with the spear.

A lateral protrusion or lug 34b extends horizontally from the spear shank slightly ahead of at least some and preferably all the grip positions of the spear gripping system. The forward edge of each lug is preferably slanted rearwardly, and the rearward edge is substantially prependicular to the spear shank where it lies against a surface of the jaws which also is substantially perpendicular to the spear shank. This arrangement provides generous overlap positively preventing spear slippage to the rear even when the spear is gripped relatively loosely, as through careless initial adjustment of the spear gripper assembly, and thus enlarges the adjustment tolerance in operation of the two sets of grips. The plant stalks split longitudinally when impaled on the spear and the lugs pass harmlessly through the splits. Preferably, a similar but square-front lug 34c is installed behind at least one spear grip position to prevent accidental forward dislocation of the spear.

FIG. 5 shows best that spear gripper drive is by motor 56 through output shaft 50 by means of shaft cams 58, 60, followers 62, 64, follower rods 66, 68, 70, 72, bellcranks 74, 76, 78, 80, and jaw actuator rods 82, 84, 86, 88, having respective pivot connections 90, 92, 94, 96, with the jaws. The drive components are mounted to the frame in conventional manner as by bolting or welding, as indicated in my aforesaid United States Patent.

FIG. 5 shows in more detail that the spear gripper system comprises four double jaws or sets of jaws, from front to rear, 98, 100, 102, 104 respectively, guided by sliding vertically in upper slots 106, in upper frame member 18a and in slots 108 in lower frame member 18b, aligned with the upper slots.

Each set of jaws comprises two straight lengths of bar 104a, 104b, for example. One, 104a, extends downward more than the other and slides in the lower slot; the upper ends are coextensive and having opposing spear holding notches as at 104c, preferably right angled and with facets oriented at 45° to the vertical. The top of each bar is bevelled so that the two bars when together form an upward facing 90° V-notch 104d for safety in operation, as described below. Pivot structure 104e, for example, connects the lower end of the shorter bar with an intermediate portion of the longer bar.

A spring 110 recessed into opposing sockets 104f, 104g, for example, in the bars, urges them apart. Should the spring fail, the 90° V-notch opens the jaws on contact with the spear and prevents jamming damage. A cam 104h, 104i, for example, at each jaw, which may be a downwardly inclined straight surface of a bar welded to each respective jaw, engages a cam follower 112, which preferably is a silent-type roller pivotally mounted to the frame on a conventional eccentric adjustment hub, and urges the jaws together in the upper portion of vertical jaw-travel.

The four sets of jaws operate as two pairs or double sets as may be seen by comparison of the spear gripping in this and the preceding FIGURE. The first and fourth or frontmost and rearmost sets of jaws 98, 104 open and shut together as indicated, and the central or second and third sets of jaws 100, 102 likewise open and shut together, one of the double sets of jaws therefore being closed while the other is open.

In this FIGURE, jaws 98, 104, the outer sets, are shown closed, rigidly holding spear 34. Jaws 100, 102, the center sets are shown open, in position to permit thrust arms of the succession of thrust arms 54 to push spear-impaled plants along the spear between open jaws of sets 100, 102, in an increment of rearward travel.

It is important to note that the spacing between the two central sets of jaws is made to be less than the spacing between either central set and the outer set proximate to it. For best results the central jaw set spacing should be equal to the distance between successive thrust arms, and the outer jaw set spacing should be one and one-half times as great, in actual embodiment these are found to work with all sizes of tobacco if made 9 inches between central sets of jaws and 13½ inches between central jaw set and outer jaw set.

FIG. 6 illustrates in two positions, closed (phantom lines) and open, the relation and structure of a typical set of jaws, 104a, 194b, the cam and follower arrangement, 104i, 112, the spear 34, the table 14, the thrust arms 54, of the proximate conveyor assemblies 32, and the frame 18a, 18b. Plants p lie on the table 14 with the upper leaves and stalks, the bulk of the plants generally, above the level of all but the grip-ends of the jaws. Lower leaves are protected as they pass by the invention in the manner disclosed herein.

The conveyor thrust arms have broad thrust faces and two successions of thrust arms pass along the length of the spear and stick aligned with the spear, one succession on each side urged along by respective proximate conveyor belts 52a, 52b, running in leaf protecting channels 18c parallel-spaced to either side of the spear gripper system upper and lower frame members.

The jaw sets or spear grippers are vertically reciprocated by the jaw actuator rods (not shown) as indicated by the double-ended arrow, and effectively disappear at the lower limit of travel, recessing into the frame. As the jaws rise, they present to the tobacco a minimal frontal aspect and the longitudinal flanges 54a of the thrust arms pause and shield the jaws from the tobacco until they close. Closed, and opening and retracting, the jaws present minimal area to touch the tobacco and are smoothly contoured so as not to hook the tobacco. The gripper jaws travel is smooth hyperbolic curves. This entire arrangement minimizes possibility of injury to tobacco plants.

FIG. 7 diagrams operation of the jaws and thrust arms. The structural dimensions and the drive ratio are made such that although synchronization is automatic and simple, through drive from shaft 50, and although the cycle is very fast, plant handling is efficient at all times. Shaft 50 appears in FIGS. 1 – 5.

a, b, and c show the relation of the parts at three successive times in one complete increment of rearward motion (arrows) of plants p1, p2, p3, p4, p5, over spear 34 and onto tobacco stick 46.

At time a, the spear is held by the central sets of jaws 100, 102, (shaded dark for emphasis) which have just closed, shielded from the plants p2 and p3 by the longitudinal flanges 54b of the thrust arms 54. The outer or first and last sets of jaws 98, 104 are open, preparatory to respective passage of plants p1, p5 through them. During this interval, plant p3 will approach jaw set 102 and plant p4 will approach jet set 100.

At time b, plants, p1, p5, have passed the first and last sets of jaws 98, 104 which have just closed, and plants p3 and p4 are in position to pass the central sets of jaws, which have just opened for the purpose.

At time c, the jaws are again in the position of time a, but continual movement together of all the plants passing them two at a time through the half-step-out-of-phase alternately opening double sets of jaws has moved the plants one interval toward the rear, p2 now occupying in the bottom diagram the position which $p1$ occupied in the top diagram.

Figure 8:
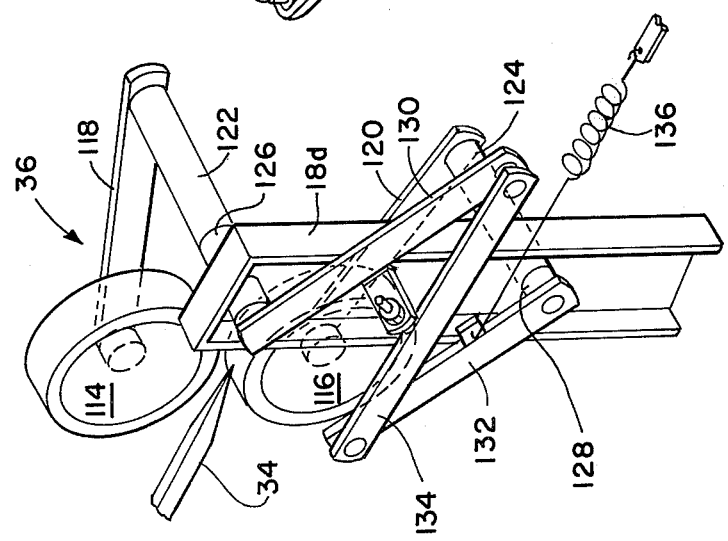
FIG. 8 is an isometric view of a plant-centering system taken at 8—8, FIG. 1.

FIG. 8 shows a co-acting feature in the form of the anti-crushing, centering system 36 for plant stalks at the spearimpalement location.

The vertical travel of the jaws onto the spear would tend to tear loose any part of a stalk caught on the spear above the jaws, such as part of a crushed stalk butt. To prevent such crushing, the centering rollers 114, 116 are respectively mounted one above the other on parallel axes transverse to the spear axis, on rearwardly disposed crank arms 118, 120 freely pivoted on one end of shafts 122, 124 in likewise transverse journals 126, 128 fixed in parallel to frame member 18d. Respective crank arms 130, 132 at the other end of the shafts form a tipped "Z" articulated linkage with a horizontal link 134 connecting them, represented by the central member of the "Z."

Spring 136 biases the link forwardly towards a fixed frame member, not shown, urging the rollers together at the point of the spear 34. Even through the rollers have soft coverings, this arrangement accommodates stalks more gently and over a wider range of stalk diameters than fixed-spacing rollers, preventing stalk crushing.

Figure 10:
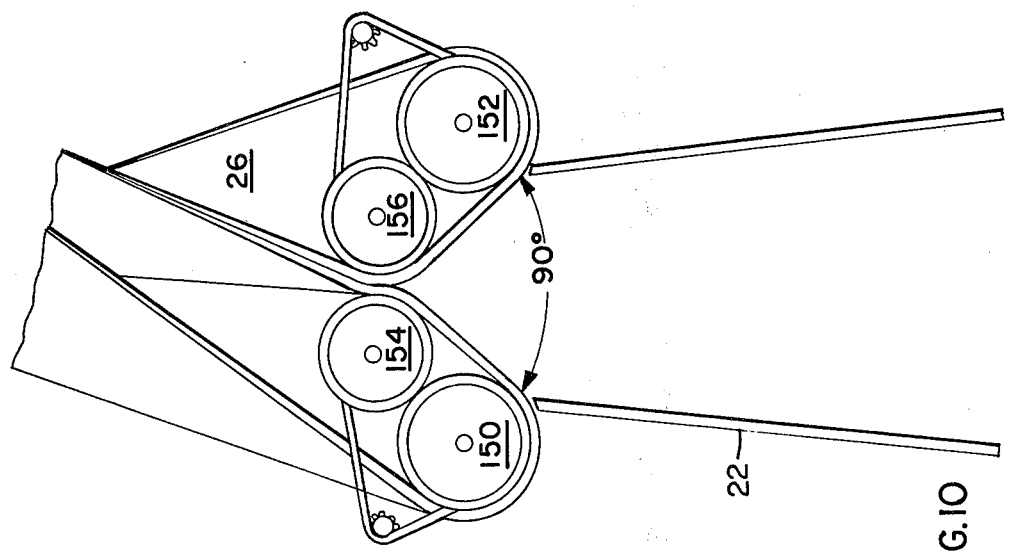
FIG. 10 is a plan view adapted from 10—10, FIG. 1.
Figure 9:
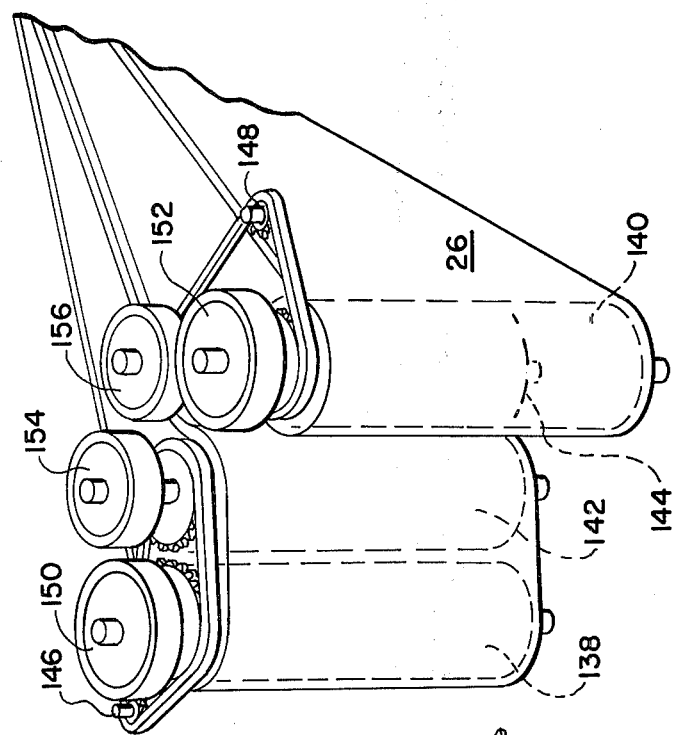
FIG. 9 is an isometric view adapted from 9—9, FIG. 1.

FIGS. 9 and 10 illustrate a further co-acting feature at the plant intake relieving the requirements on the transport and centering systems.

Under certain infrequent conditions it was found, the plant intake structure would delay slightly in seizing and removing a plant as it was severed from the ground resulting in feeding two plants together through the system. The plant shuttle system, and the fixed distance centering rollers then employed, would sometimes help prevent double feeding onto the spear, but at some danger of tearing or crushing the stalk.

To eliminate this problem entirely, novel, modified intake structure is provided as illustrated. The new structure changes the plan-configuration of the belt runs at the intake from the former acute "V" shape with a roller-defined radius exposed to the plants at each end of the "V," to substantially a 90°-throat "Y" shaped conjunction of rearward conveyor belt portions without the exposed radii.

The plant guides 22 and the spacing and angular relation between them remain, as before, adjusted to and, determined entirely by plant configuration. The forwardmost, vertical rollers 138, 140 of the belt conveyor system are laterally spaced a distance placing the inner circumferences formed by the belts 26 over the rollers nearly tangent to rearward projection of the planes of the guides so that they are largely outboard of the projection planes. This conceals from the plants taken in the abruptly radiused curve of the rollers which might tend to throw some plants toward the center rather than rearwardly, by locating the rollers outboard of the rears of the guides.

In one embodiment the spacing between the rollers was increased from 2 inches to 10 inches to accomplish this.

To compensate for the increased throat width, a second pair of rollers 142, 144, is disposed either as idlers or as members driven, as from drive sprockets 146, 148 on conventional bearings and supports, generally parallel with the first pair of rollers and immediately rearwardly of the first pair, forming in plan the "Y" shaped intake by forcing the opposed belt runs inward.

To insure control and protection of the tops of tall plants, with the new, wide-throat intake a wheel-like soft-rim roller 150, 152, 154, 156, is mounted coaxially to the top of each of the forwardmost or drive rollers.

Obviously many modifications and variations of the present invention are possible in the light of the above teachings. For example, although the jaws preferably safely spring open, they could be positively driven; further, the cams can be on the frame and the rollers on the jaws; still further, both slots in the frame can receive both jaws rather than in the stable, self-centering configuration described. It is therefore to be understood that within the scope of the appended claims, the invention may be practiced otherwise than as specifically described.

What is claimed and desired to be secured by United States Letters Patent is:

1. In a tobacco harvester having a frame supporting a plant handling system including a horizontally disposed spear with a pointed end, means for causing the spear to impale a plurality of tobacco plant stalks in succession, and means for gripping the spear alternately at different positions permitting impaled tobacco plant stalks to pass along the spear, an improved plant handling system comprising: a plurality of sets of opposed jaws spaced along the length of the spear, means for translating each said set of jaws together to and from the spear, and means for opening and closing said jaws in synchronism with said translation.

2. In a tobacco harvester as recited in claim 1, and means for recessing the jaws into shielding means when at the limit of translation away from the spear.

3. In a tobacco harvester as recited in claim 1, said translation being in a plane perpendicular to the spear.

4. In a tobacco harvester as recited in claim 1, said translation being in a substantially vertical plane and below the spear.

5. In a tobacco harvester as recited in claim 1, said means for opening and closing the jaws including means for pivotally opening and closing the jaws.

6. In a tobacco harvester as recited in claim 5, the means for pivotally opening and closing the jaws including pivot structure connecting lower portions of a pair of said jaws, resilient means biasing the jaws apart and cam and cam follower structure guiding each jaw relative to the frame of the harvester.

7. In a tobacco harvester as recited in claim 6, the means for translating each set of jaws including a frame having upper guide structure, and lower guide structure vertically aligned with the upper guide structure.

8. In a tobacco harvester as recited in claim 7, the upper guide structure dimensioned for receiving both jaws of a set, the lower guide structure dimensioned for receiving a downward extension of a single jaw.

9. In a tobacco harvester as recited in claim 6, the cam structure comprising a downwardly extending cam on each jaw and a respective cam follower affixed to the frame above each cam.

10. In a tobacco harvester as recited in claim 6, each cam follower comprising a roller, and, additionally, means for adjusting the position of at least one said roller.

11. In a tobacco harvester as recited in claim 1, and means for recessing said jaws, comprising a frame member having an opening for at least one set of jaws with said at least one set of jaws passing therethrough, the frame member disposed a distance from the spear causing said at least one set of jaws to retract into said opening to one limit of said translation.

12. In a tobacco harvester as recited in claim 1, each said set of jaws comprising first and second elongate members free at a first end thereof and movably connected together proximate a second end thereof, and with opposed spear-gripping structure adjacent said first end.

13. In a tobacco harvester as recited in claim 12, said first and second elongate members co-extensive at said first end, with each said elongate member having a bevel on the end thereof, the bevels together forming an upward "V" notch.

14. In a tobacco harvester as recited in claim 12, said spear having a polygonal cross-section with facets thereof angled relative to each other, and said opposed spear gripping structure including a correspondingly angled "V" shaped notch in each jaw of each said set of jaws.

15. In a tobacco harvester as recited in claim 14, said spear having a lug thereon proximately rearward of at least one set of jaws and a lug thereon proximately forward of at least one set of jaws.

16. In a tobacco harvester as recited in claim 1, the plurality of sets of opposed jaws including at least four sets of opposed jaws, the means for translating each set of jaws including means operatively connecting the foremost and rearmost sets of jaws for translation together, and means operatively connecting the central two sets of jaws for translation together in opposite phase to translation of the foremost and rearmost sets of jaws.

17. In a tobacco harvester as recited in claim 16, the distance between the central two sets of jaws being a first said spacing, the distance between either of the central two sets of jaws and the proximate set of jaws other than jaws of the central set being a second said spacing, and the second said spacing being greater than the first said spacing.

18. In a tobacco harvester as recited in claim 17, the means for causing the spear to impale a plurality of tobacco plant stalks in succession including a plurality of equally spaced thrust arms, and means for causing all said thrust arms to pass in succession proximate the length of the spear, the equal spacing between thrust arms being substantially the same as the first said spacing between the central two sets of jaws.

19. In a tobacco harvester as recited in claim 18, the second said spacing being substantially one and one-half times as great as the first said spacing.

20. In a tobacco harvester as recited in claim 1, a pair of centering rollers disposed on transverse horizontal axes one above the other at the said pointed end of the spear, and means resiliently urging the pair of centering rollers together.

21. In a tobacco harvester as recited in claim 1, the means for causing the spear to impale a plurality of tobacco stalks including a tobacco plant intake comprising a forwardly extending pair of laterally spaced plant-guides, a pair of opposed endless, rearward-conveyor belts, a forward and a rearward roller mounting each conveyor belt, the forward rollers being substantially vertical and laterally spaced a distance locating them respectively largely outboard of a rearward projection of the plane of the respective plant guides, and an idler roller proximately behind each forward roller, said idler rollers forcing together a portion of the respective conveyor belts, forming a "Y" shaped conjunction of the conveyor belts at the forward portions thereof.

22. In a tobacco harvester as recited in claim 21, each said forwardmost roller having a roller co-axially mounted thereabove.

23. In a tobacco harvester as recited in claim 22, the throat of said "Y" shaped conjunction being substantially a right angle in plan view.

24. The method of operating a spearing mechanism in synchronously urging plants serially onto a spear in a tobacco harvester comprising the steps:
 a. simultaneously gripping proximate the ends of the spear with a first pair of gripping means and the center of the spear with a second pair of gripping means,
 b. releasing the grip of the first pair of gripping means and translating the first pair of gripping means to a shielded position below the spear,
 c. translating the first pair of gripping means to the spear and gripping the spear therewith; and
 d. releasing the grip of and translating the second paid of gripping means to a shielded position below the spear.

25. The method as recited in claim 24, and the additional step, prior to step (a), of: spacing the first pair of gripping means a distance apart along the spear and spacing each of the second pair of gripping means one-and one-half times said distance from the respective proximate gripping means of the first pair of gripping means, 26. The method as recited in claim 25 and the additional step following step (d) of establishing in said urging a plant serial spacing substantially equal to said distance apart of the first pair of gripping means.

* * * * *